United States Patent
Cardin et al.

(10) Patent No.: US 10,604,164 B2
(45) Date of Patent: Mar. 31, 2020

(54) TRAIN MADE UP OF A PLURALITY OF RAIL VEHICLES HAVING TWO LEVELS FOR PASSENGERS AND FREIGHT

(71) Applicant: Metrolab, Paris (FR)

(72) Inventors: Olivier Cardin, Paris (FR); Paola Tovoli, Paris (FR); Régis Cadot, Paris (FR)

(73) Assignee: Metrolab, Paris (FR)

( * ) Notice: Subject to any disclaimer, the term of this patent is extended or adjusted under 35 U.S.C. 154(b) by 289 days.

(21) Appl. No.: 15/562,421

(22) PCT Filed: Jun. 8, 2015

(86) PCT No.: PCT/EP2015/062720
§ 371 (c)(1),
(2) Date: Sep. 28, 2017

(87) PCT Pub. No.: WO2015/121506
PCT Pub. Date: Aug. 20, 2015

(65) Prior Publication Data
US 2018/0281822 A1 Oct. 4, 2018

(30) Foreign Application Priority Data

Apr. 16, 2015 (FR) ..................................... 15 53388

(51) Int. Cl.
*B61D 1/06* (2006.01)
*B61F 1/08* (2006.01)
(Continued)

(52) U.S. Cl.
CPC .................. *B61D 1/06* (2013.01); *B61B 1/00* (2013.01); *B61C 17/06* (2013.01); *B61D 27/00* (2013.01);
(Continued)

(58) Field of Classification Search
CPC .......... B61D 1/06; B61D 47/00; B61D 27/00; B61D 45/007; B61B 1/00; B64C 1/20; B61C 17/06; B61F 1/08
See application file for complete search history.

(56) References Cited

U.S. PATENT DOCUMENTS 3,262,588 A * 7/1966 Davidson .................. B60P 1/52
414/536
3,263,832 A * 8/1966 Williams, Jr. ....... B65G 63/025
414/344
(Continued)

FOREIGN PATENT DOCUMENTS

CH          679296 A5    7/1988
CN         1420048 A     5/2003
(Continued)

OTHER PUBLICATIONS

French Patent Application No. 15 53388, Rapport de Recherche Préliminaire, Mar. 8, 2016, 3 pages.
(Continued)

*Primary Examiner* — Scott A Browne
(74) *Attorney, Agent, or Firm* — Soquel Group LLC (57) ABSTRACT

A train made up of a plurality of rail vehicles, each rail vehicle including a body defining an upper level able and intended to accommodate and transport passengers, and a lower level intended to load, transport and unload freight, the lower level having a lower floor defined by the body. An assembly of such a train, and a station able to receive the train in a stopped position allowing travelers to embark and disembark.

8 Claims, 5 Drawing Sheets

(51) Int. Cl.
  *B61D 47/00* (2006.01)
  *B61C 17/06* (2006.01)
  *B61B 1/00* (2006.01)
  *B61D 27/00* (2006.01)
  *B61D 45/00* (2006.01)

(52) U.S. Cl.
  CPC ........... *B61D 45/007* (2013.01); *B61D 47/00* (2013.01); *B61F 1/08* (2013.01); *Y02T 30/18* (2013.01)

(56) References Cited

U.S. PATENT DOCUMENTS

| | | | | |
|---|---|---|---|---|
| 3,892,188 | A | * | 7/1975 | Warren .................... B61D 1/06 410/28 |
| 4,544,319 | A | * | 10/1985 | Folling .................... B64D 9/00 198/457.03 |
| 5,106,038 | A | * | 4/1992 | Dupont .................... B64C 1/20 244/118.1 |
| 5,562,374 | A | * | 10/1996 | Plamper ................... B61D 1/06 105/1.1 |
| 2009/0320713 | A1 | * | 12/2009 | Amiri .................... B61B 13/00 104/281 |
| 2010/0242513 | A1 | * | 9/2010 | Nishino ............. B60H 1/00371 62/244 |
| 2016/0214718 | A1 | * | 7/2016 | Rajeev .................... B64D 9/00 |
| 2017/0217561 | A1 | * | 8/2017 | Clos .......................... B64C 1/20 |

FOREIGN PATENT DOCUMENTS

| | | | | |
|---|---|---|---|---|
| CN | 101327799 | A | | 12/2008 |
| CN | 201362254 | Y | | 12/2009 |
| CN | 103171563 | A | * | 6/2013 |
| CN | 103171563 | A | | 6/2013 |
| DE | 3940620 | A1 | | 6/1991 |
| DE | 4120590 | A1 | | 12/1992 |
| EP | 0642964 | A1 | | 3/1995 |
| EP | 1024070 | A1 | | 8/2000 |
| EP | 1792829 | A1 | * | 6/2007 ............... B61D 3/20 |
| EP | 1792829 | A1 | | 6/2007 |
| FR | 2076743 | | | 10/1971 |
| JP | 200188690 | A | | 4/2001 |

OTHER PUBLICATIONS

PCT Application No. PCT/EP2015/062720, International Search Report, dated Dec. 22, 2015, 6 pages.

* cited by examiner

TRAIN MADE UP OF A PLURALITY OF RAIL VEHICLES HAVING TWO LEVELS FOR PASSENGERS AND FREIGHT

CROSS-REFERENCES TO RELATED APPLICATIONS

This application claims priority benefit under 35 U.S.C. § 371 to International Patent Application No. PCT/EP2015/062720 entitled TRAINS MADE UP OF A PLURALITY OF RAIL VEHICLES HAVING TWO LEVELS FOR PASSENGERS AND FREIGHT, and filed by inventors Olivier Cardin, Paola Tovoli and Régis Cadot on Jun. 8, 2015. International Patent Application No. PCT/EP2015/062720 claims priority to French Patent Application No. 15 53388, filed by inventors Olivier Cardin, Paola Tovoli and Régis Cadot on Apr. 16, 2015.

FIELD OF THE INVENTION

The present invention relates to a train consisting of a plurality of rail vehicles.

BACKGROUND OF THE INVENTION

To diversify the means for transporting goods, in particular in large city centers, one known possibility is to transport freight using railway infrastructure.

Yet these large cities ordinarily have a passenger railway transport network, for example a subway.

It is known to use separate rail vehicles to convey passengers on the one hand, and freight on the other hand. However, to date there is no mixed rail vehicle system that provides a good compromise between technical efficiency, for example the fact that passenger transport is not disrupted by transporting freight, and economic efficiency.

SUMMARY

One aim of the invention is therefore to provide a train made up of rail vehicles allowing travelers and freight to be conveyed at the same time and having a good compromise between technical efficiency and cost.

To that end, the invention relates to a train of the aforementioned type, in which each rail vehicle of the train comprises a body defining:

an upper level of the rail vehicle able and intended to accommodate and transport passengers, and
a lower level of the rail vehicle suitable for loading, transporting and unloading freight, the lower level having a lower floor defined by the body.

According to specific embodiments, the train comprises one or more of the following features, considered alone or according to all technically possible combinations:

any two adjacent rail vehicles of said plurality are connected by an inter-circulation zone able to allow travelers to move between the upper levels of the two rail vehicles;
the upper level of each rail vehicle has a flat upper floor intended to allow travelers direct access to a platform, each rail vehicle having no access steps extending between the platform and the upper floor;
the lower level of each rail vehicle defines at least one freight compartment suitable for receiving at least one container in a transport position in which the container rests on the lower floor, the container having at least part of the freight;
the freight compartment has at least one side opening relative to a transport direction of the rail vehicle, the side opening being permanent and able to allow loading and unloading of the container;
each rail vehicle comprises at least one locking system to lock the container relative to the freight compartment in the transport position;
the locking system is movable between a locked configuration, suitable for immobilizing the container in the transport position, and an unlocked configuration, suitable for freeing the container, each rail vehicle comprising a control module able to order the locking system to go from the locked configuration to the unlocked configuration when the rail vehicle is stopped;
the lower floor has a plurality of rollers suitable for rolling the container from an initial loading position, in which the container is situated partly outside the freight compartment, to the transport position, and vice versa, from the transport position to a position in which the container is situated at least partly outside the freight compartment;
each rail vehicle comprises, on the roof, members for heating, ventilation or air conditioning of the upper level, or electromechanical members situated on the lower level, on either side of the freight compartment in the transport direction, the electrochemical members comprising one or several members chosen from among: at least one compressed air tank, at least one braking module of the rail vehicle, an air compressor, an electrical box, a traction system of the rail vehicle, at least one unit having a battery and at least one charger to power the battery, and at least one electric converter; and
the lower level of each rail vehicle defines at least two adjacent freight compartments in a transverse direction perpendicular to the transport direction, the two freight compartments being suitable for respectively receiving a container and respectively having two transversely opposite side openings.

The invention also relates to an assembly of a train as described above and a station able to receive the train in the stopped position allowing passengers to embark and disembark between a platform of the station and the upper level of each rail vehicle, the station including at least one device suitable for loading and unloading the freight, the device being situated below the platform.

BRIEF DESCRIPTION OF THE DRAWINGS

The invention will be better understood upon reading the following description, provided solely as an example, and done in reference to the appended drawings, in which.

DETAILED DESCRIPTION

Figure 1:
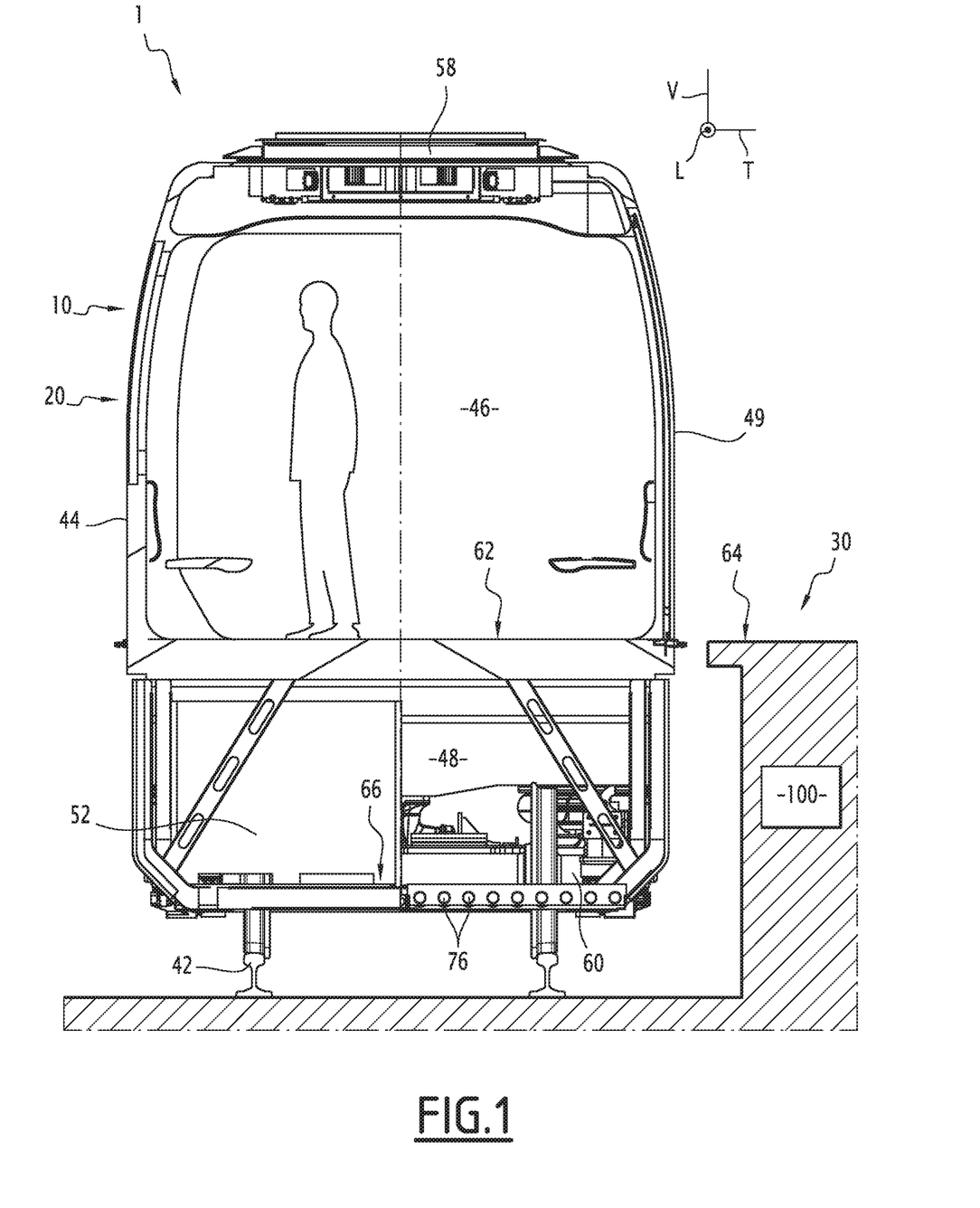
FIG. 1 is a sectional view of a train according to the invention, the section being done at one of the rail vehicles of the train, the left part of the figure corresponding to a section along a vertical transverse plane P1 situated longitudinally at a beam of a freight compartment loaded with a container, and the right part corresponding to a section along a plane P2 parallel to the plane P1 and situated longitudinally between two beams of a freight compartment with no container.

An assembly 1 according to the invention is described in reference to FIG. 1.

The assembly 1 comprises a train 10 made up of a plurality of rail vehicles 20, and a station 30 able to receive the train in a stopped position.

Figure 3:
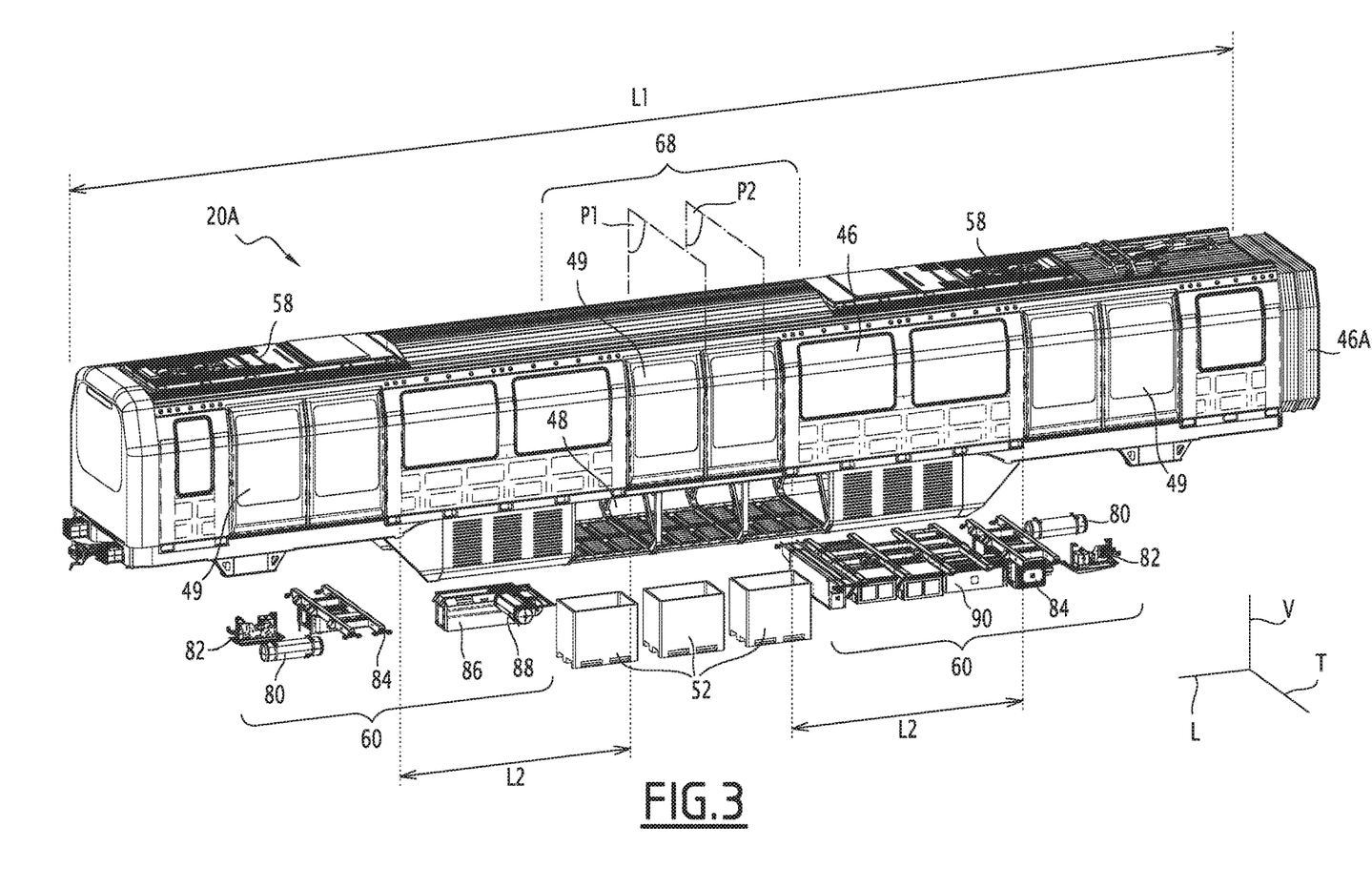
FIG. 3 is a perspective view of a head vehicle of the train shown in FIG. 1.
Figure 4:
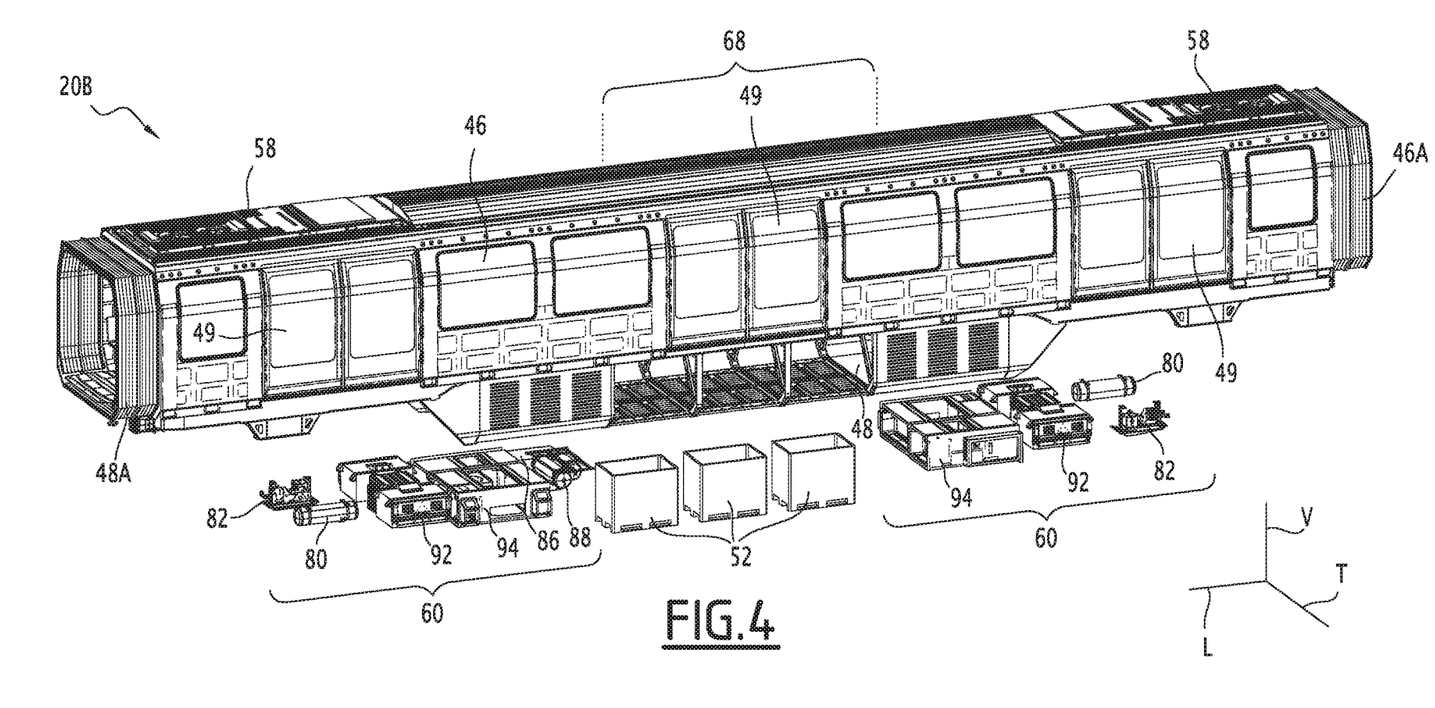
FIG. 4 is a perspective view of a towed vehicle of the train shown in FIG. 1.
Figure 5:
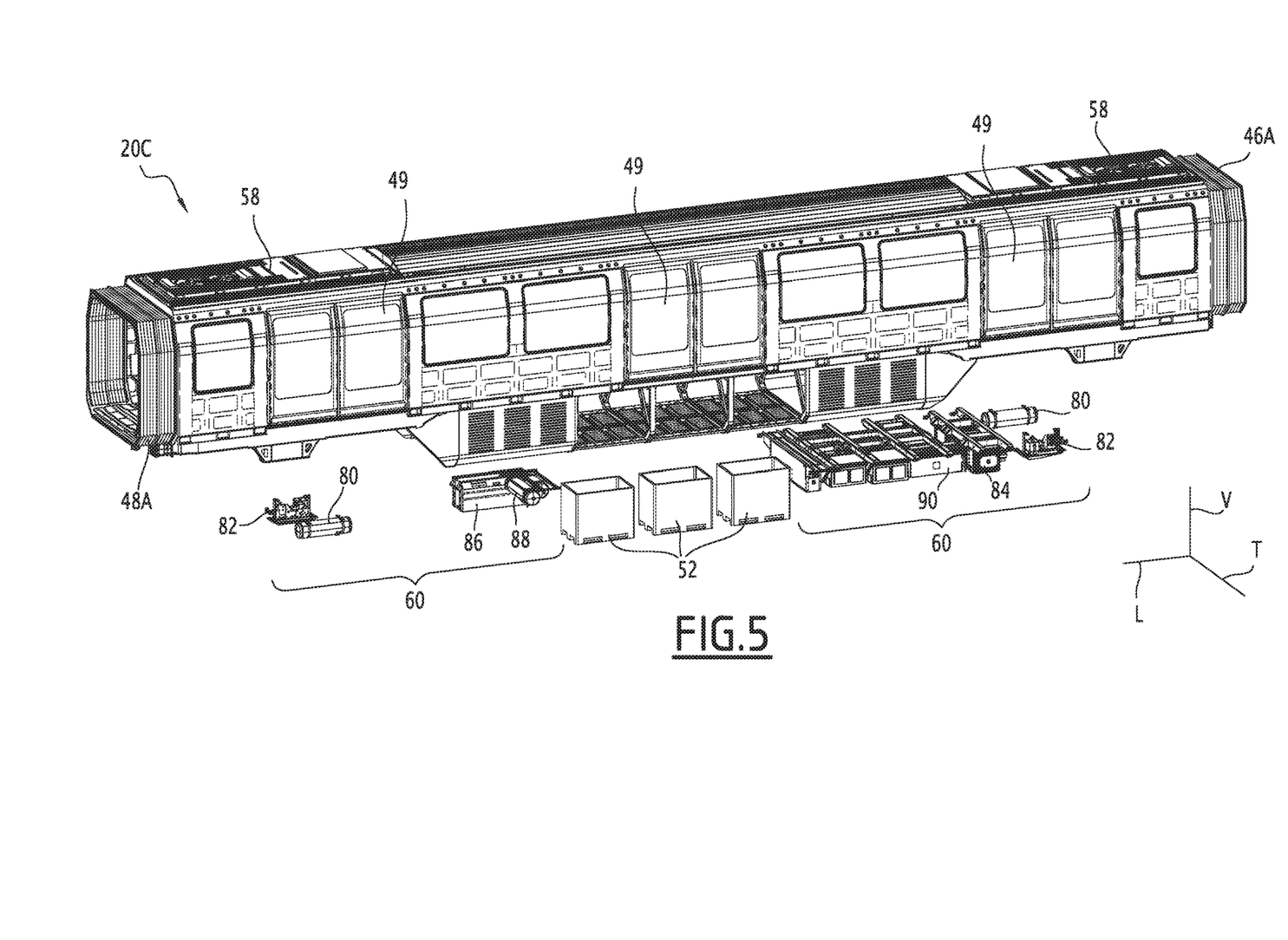
FIG. 5 is a perspective view of a motorized vehicle of the train shown in FIG. 1, separate from the head vehicle shown in FIG. 3.

The plurality of rail vehicles advantageously comprises vehicles of different types, for example a head vehicle 20A shown in FIG. 3, at least one towed vehicle 20B shown in FIG. 4, and at least one motorized vehicle 20C shown in FIG. 5.

The train 10 is intended to travel and park on a railway track 42. The train 10 extends along a longitudinal direction or transport direction.

A vertical direction V and a transverse direction T substantially perpendicular to the transport direction L and the vertical direction V are also defined.

The train 10 is for example a broad-gauge subway, suitable for transporting passengers and freight simultaneously in large metropolises.

The train 10 for example comprises four rail vehicles 20.

According to one particular embodiment, the train 10 for example comprises eight rail vehicles 20.

The train 10 is adapted to stop in the station 30 and to allow travelers (one of whom is shown in FIG. 1) to embark or disembark from the rail vehicles 20.

Each rail vehicle 20 of the train 10 comprises a body 44 defining an upper level 46 of the rail vehicle able and intended to accommodate and transport passengers, and a lower level 48 intended to load, transport and unload freight.

Each rail vehicle 20 for example has a beam L1 (FIG. 3) of about 22 m. Advantageously, each rail vehicle 20 respects the UIC Standard B gauge.

Any two adjacent rail vehicles 20 of the train 10 are connected to one another by an inter-circulation zone 46A able to allow travelers to move between the upper levels 46 of the two rail vehicles 20 in question.

Each rail vehicle 20 for example has six access doors 49 to the upper levels 46.

Figure 2:
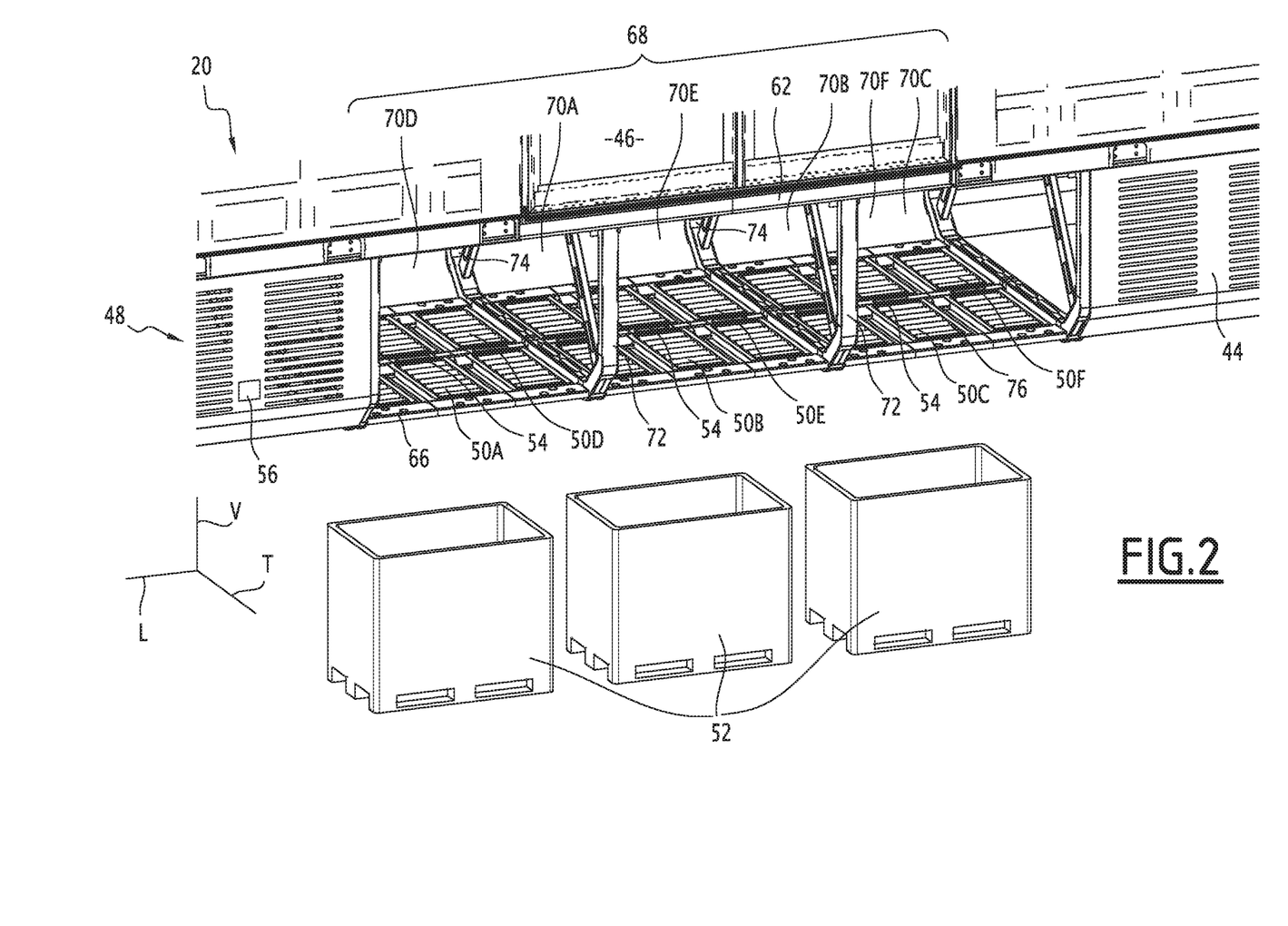
FIG. 2 is a perspective view of the freight compartment of the rail vehicles of the train shown in FIG. 1.

As shown in FIG. 2, each rail vehicle 20 comprises, in the illustrated example, six freight compartments 50A, 50B, 50C, 50D, 50E, 50F defined by the lower level 48 and suitable for receiving containers 52, three of which are shown in FIG. 2.

Each rail vehicle 20 further comprises locking systems 54 to lock the containers 52 in an immobilized position relative to the containers 50A to 50F, and a control module 56 able to order the locking systems 54 to enter a locked configuration, in which the containers 52 are in a transport position relative to the compartments 50A to 50F, respectively, and to an unlocked configuration suitable for releasing or receiving the containers 52 in the compartments 50A to 50F.

Lastly, each rail vehicle 20 comprises, on the roof, means 58 for heating, ventilation or air-conditioning of the upper level 46, and, in the lower level 48, electromechanical members 60, on either side of the freight compartments 52 along the transport direction L, advantageously in the underframe.

The upper level 46 extends vertically from an upper floor 62 suitable for the circulation of travelers in the rail vehicle 20, to the roof 58.

The doors 49 are advantageously distributed symmetrically on either side of the transport direction L. The doors 49 situated on the same side are for example separated by a same distance L2 advantageously equal to about 7.3 m.

The upper floors 62 of any two adjacent rail vehicles 20 are connected to one another by the inter-circulation zones 46A.

The upper floors 62 are advantageously flat and allow direct access to a platform 64 of the station 30. "Direct access" means that each rail vehicle 20 is advantageously provided with no access step extending vertically between the platform 64 and the upper floor 62. The upper floor 62 is advantageously situated vertically substantially at the same level as the platform 64. "Substantially at the same level" here advantageously means that the height difference between the upper floor 62 and the platform 64 along the vertical direction V is compliant with requirements relative to access for persons with reduced mobility to the rail vehicle 20. For example, this difference is less than 50 mm.

The lower level 48 comprises a lower floor 66 defined by the body 44 and supporting the containers 52 in the transport position. The lower level 48 extends vertically from the lower floor 66 to the upper floor 62.

The lower level 48 advantageously extends between two bogies of the rail vehicle 20 along the transport direction L.

The upper level 46 advantageously extends over the entire length L1 of the rail vehicle 20 along the transport direction L.

In the illustrated example, the freight compartments 50A to 50F are arranged in a median part 68 (FIG. 2) of the rail vehicle 20 along the transport direction L, advantageously equidistant from the longitudinal ends of the rail vehicle 20.

Each of the freight compartments 50A to 50F has a side opening 70A, 70B, 70C, 70D, 70E, 70F defined by the body 44 and suitable for allowing the loading and unloading of containers 52 along a transverse direction T. Advantageously, the side openings 70A, 70B, 70C, 70D, 70E, 70F do not have any closing means.

The freight compartments 50A, 50B, 50C are respectively transversely adjacent to the freight compartments 50D, 50E, 50F. The pairs of freight compartments 50A-50D, 50B-50E and 50C-50F advantageously follow one another along the transport direction L.

The side openings 70A to 70C are separated from one another by two uprights 72 of the body 44 connecting the lower floor 66 to the upper floor 62. Likewise, the side openings 70D to 70F are separated by uprights 74.

The containers 52 are advantageously compliant with standard ISO 6780, with a base for example of 1200×800 mm. The containers 52 for example have a maximum overall height of 1000 mm.

The lower floor 66 advantageously has a plurality of rollers 76 (FIGS. 1 and 2) suitable for rolling the containers 52 from an initial loading position (FIG. 2), in which each container 52 is situated at least partly outside its freight compartment 50A to 50F, to its transport position (FIG. 1), and the reverse during unloading.

The rollers 76 have rotation axes advantageously substantially parallel to the transport direction L. For each compartment 50A to 50F, these axes are for example situated in a plane advantageously inclined relative to the horizontal, so as to create a downward slope transversely from the side openings 70A, 70B, 70C, 70D, 70E, 70F toward a median axis of the vehicle 20 oriented along the transport direction L.

In reference to FIG. 3, the electromechanical members 60 of the head vehicle 20A for example comprise two compressed air tanks 80, two braking modules 82 able to allow braking of the head vehicle, two air compressors 84, an electrical cabinet 86, an air tank 88, and a traction system 90 suitable for pulling the head vehicle.

Advantageously, the electromechanical members 60, of which there are two, are situated on either side of the median part 68 along the transport direction L.

In reference to FIG. 4, the electromechanical members 60 of the towed vehicle(s) 20B comprise two compressed air tanks 80, and two braking modules 82, an electrical cabinet 86, an air tank 88, two units 92 having batteries and a charger, and two electric converters 94. The same remark as above applies to the two electromechanical members 60.

In reference to FIG. 5, the electromechanical members 60 of the motorized vehicle(s) 20C comprise two compressed air tanks 80 and two braking modules 82, an air compressor 84, an electrical cabinet 86 and an air tank 88, and a traction system 90.

The station 30 further comprises devices 100 (FIG. 1) suitable for loading and unloading the freight, i.e., in the illustrated example, the containers 52.

Each device 100 is situated below the platform 64 in the illustrated example.

The device 100 is situated opposite the compartments 50A to 50C, or 50D to 50F depending on the direction of travel, when the train 10 is stopped in the station.

The operation of the assembly 1 will now be described.

Once the train 10 is stopped in a station 30, the control module 56 of each rail vehicle 20 unlocks the locking systems 54 of the freight compartments 50A to 50F situated on the side of the platform where the train is parked.

The opening of the doors 49 of the upper level 46 is also authorized once the train 10 is stopped and the exchange of passengers (passenger embarkation and disembarkation) may begin if applicable.

The devices 100 grasp the containers 52 and taken from the transport position (FIG. 1) to an unloaded position (FIG. 2).

During this unloading, the containers 52 present in the freight compartments 50A to 50C (50D to 50F, respectively), and needing to be unloaded, roll on the rollers 76 along a transverse direction T and pass through the side openings 70A to 70C (70D to 70F, respectively) according to the direction of travel of the train 10.

During this time, any travelers embark or disembark from the upper levels 46 of the rail vehicles 20 of the train 10. The travelers go directly from the upper floor 62 to the platform 64 without using any access steps.

If they wish, the passengers go from one rail vehicle 20 to another rail vehicle using inter-circulation zones 46A.

Still during the traveler exchange time, if applicable, new containers 52 are loaded into the freight compartments 50A to 50C (or 50D to 50F, depending on the direction of travel of the train) that are empty when the train arrives in the station, using devices 100.

Once the containers 52 are loaded, each control module 56 orders the locking systems 54 to lock the containers in their transport position relative to the freight containers 50A to 50F.

Once all of the containers 52 are on board the train 10 and correctly locked, the train is authorized to leave the station 30 so that it can, if applicable, stop in another station similar to the station 30. In this similar station, some containers 52 will be unloaded, or along any other point of the line. If applicable, new containers 52 will be loaded.

The freight loading and unloading will advantageously be done perpendicular to the direction of transport L.

Owing to the features described above, in particular the fact that each rail vehicle 20 of the train 10 comprises the upper level 46 dedicated to passengers and the lower level 48 dedicated to freight, the train 10 constitutes a mixed transport system that is both very efficient and inexpensive.

The insertion of areas intended to transport freight in the lower level 48 within the rail vehicle 20 is advantageously done such that the upper level 46 is modified little or not at all relative to the area intended for travelers in traditional rail vehicles. For example, the upper floors 62 remain flat.

Likewise, the nature of the passenger flows, in particular the traveler exchange times when the train 10 is parked, are not substantially altered.

The train 10 advantageously allows very fast loading or unloading of the containers 52, for example less than twenty seconds.

Owing to the optional feature according to which the freight compartment(s) 50A to 50F are situated in the median part 68, weight balancing in the rail vehicle 20 along the transport direction L is disrupted little or not at all by the potential presence of containers 52.

This is further strengthened by the optional feature according to which the two electromechanical members 60 are situated on either side of the median part 68 along the transport direction L.

The invention claimed is:

1. A train made up of a plurality of rail vehicles, wherein each rail vehicle of the train comprises a body defining:
    an upper level of the rail vehicle able and intended to accommodate and transport passengers; and
    a lower level of the rail vehicle suitable for loading, transporting and unloading freight, the lower level comprising:
        a lower floor defined by the body;
        at least two adjacent freight compartments in a transverse direction perpendicular to the transport direction, the freight compartments being suitable for respectively receiving a container and respectively comprising two transversely opposite side openings; and
        a plurality of rollers suitable for rolling the containers from an initial loading position, in which the containers are situated partly outside said freight compartments, to the transport position, and vice versa, from the transport position to a position in which the containers are situated at least partly outside said freight compartments, and the rollers comprising rotation axes situated in a plane inclined relative to the horizontal, so as to create a downward slope transversely from said side openings toward a median axis of the rail vehicles oriented along the transport direction.

2. The train according to claim 1, wherein any two adjacent rail vehicles of said plurality are connected by an inter-circulation zone able to allow travelers to move between said upper levels of the two rail vehicles.

3. The train according to claim 1, wherein at least one of said side openings of each freight compartment allows loading and unloading of the freight compartment's container.

4. The train according to claim 1, wherein each rail vehicle comprises at least one locking system to lock the containers relative to said freight compartments in the transport position.

5. The train according to claim 4, wherein said locking system is movable between a locked configuration, suitable for immobilizing the containers in the transport position, and an unlocked configuration, suitable for freeing the containers, each rail vehicle comprising a control module able to order said locking system to go from the locked configuration to the unlocked configuration when the rail vehicle is stopped.

6. The train according to claim 1, wherein each rail vehicle comprises:
- on the roof, members for heating, ventilation or air-conditioning of said upper level; or
- electromechanical members situated on said lower level, on either side of said freight compartments in the transport direction, the electrochemical members comprising one or several members chosen from among: at least one compressed air tank, at least one braking module of the rail vehicle, an air compressor, an electrical box, a traction system of the rail vehicle, at least one unit having a battery and at least one charger to power the battery, and at least one electric converter.

7. An assembly of a train as described by claim 1, and a station able to receive the train in the stopped position allowing passengers to embark and disembark between a platform of the station and the upper level of each rail vehicle.

8. The train according to claim 1, wherein said upper level of each rail vehicle comprises a flat upper floor, wherein said upper level is configured to allow travelers direct access to a side platform from the upper floor, each rail vehicle having no access steps extending between the platform and the upper floor.

* * * * *